US012358001B1

(12) United States Patent
StJohn

(10) Patent No.: US 12,358,001 B1
(45) Date of Patent: Jul. 15, 2025

(54) MINERAL SEPARATION TABLE

(71) Applicant: Matthew StJohn, Denver, CO (US)

(72) Inventor: Matthew StJohn, Denver, CO (US)

( * ) Notice: Subject to any disclaimer, the term of this patent is extended or adjusted under 35 U.S.C. 154(b) by 0 days.

(21) Appl. No.: 18/607,358

(22) Filed: Mar. 15, 2024

(51) Int. Cl.
*B03B 13/00* (2006.01)
*B03B 5/04* (2006.01)

(52) U.S. Cl.
CPC ................ *B03B 13/00* (2013.01); *B03B 5/04* (2013.01)

(58) Field of Classification Search
CPC .................................. B03B 13/00; B03B 5/04
See application file for complete search history.

(56) References Cited

U.S. PATENT DOCUMENTS 4,194,970 A 3/1980 Clem
4,251,358 A 2/1981 Mozley
4,278,537 A 7/1981 Schmidt et al.
4,304,661 A 12/1981 Nelson
4,624,370 A 11/1986 Danner et al.
4,962,858 A 10/1990 Newman et al.
5,108,589 A 4/1992 Sherman
5,699,918 A 12/1997 Dunn
5,904,254 A 5/1999 Tinsley et al.
8,853,584 B2 3/2014 Roos et al.
10,464,754 B2 11/2019 Miller et al.
10,525,472 B1 * 1/2020 Pandey ............ B01L 3/502792
10,618,058 B2 4/2020 Anderson et al.
2011/0186486 A1 8/2011 Alderson et al.

* cited by examiner

*Primary Examiner* — Jacob S. Scott
*Assistant Examiner* — Miraj T. Patel
(74) *Attorney, Agent, or Firm* — Kenneth Altshuler

(57) ABSTRACT

Separating target particles from discard particles in an aggregate using tailored frequencies in a mineral separation table is described. The separation table comprises a planar surface angled in a −z direction along the +x axis at an angle α and in the −z direction along the +y axis at an angle β. A motor is responsive to a first or second vibration wave train received by a controller. The motor vibrates the table with the vibration wave train thereby separating target from discard particles by differences in specific gravity. The first vibration wave train is a plurality of primary half sine waves each followed by a pause. The second vibration wave train is the plurality of the primary half sine waves and a plurality of high frequency sine waves having a frequency that is higher than the primary half sine wave.

20 Claims, 12 Drawing Sheets

MINERAL SEPARATION TABLE

CROSS-REFERENCE TO RELATED APPLICATIONS

None

BACKGROUND OF THE INVENTION

1. Field of the Invention

The present invention relates generally to separating target particles from discard particles in an aggregate by specific gravity using tailored frequencies in a mineral separation table.

2. Description of Related Art

Being able to mine gold dust in an efficient manner presents an opportunity to capture gold that would otherwise be lost and discarded as tailings. Mineral separation tables play a role in the mining industry, specifically in the task of efficiently separating dust particles from minerals during the extraction process. These tables utilize a combination of gravity, single pulse vibration followed by a long pause with a duty cycle that is about 50% with water to segregate valuable minerals from otherwise unwanted dust and debris. The principle behind their operation involves the stratification of particles based on their density, allowing heavier minerals to settle while lighter dust particles are carried away. Though mineral separation tables contribute significantly to the overall efficiency of mining operations, they all use either a single pulse vibration followed by a long pause or a single sinusoidal vibration.

It is to innovations related to this subject matter that the embodiments of the invention are generally directed.

SUMMARY OF THE INVENTION

The present invention relates generally to separating target particles from discard particles in an aggregate by specific gravity using tailored frequencies in a mineral separation table.

In that light, certain embodiments of the present invention envision a mineral separation arrangement having a mineral separation table that is made to vibrate in order to separate out target materials based on different specific gravities. In one embodiment, gold is separated out from earth tailings by way of vibrating a planar surface of the mineral separation table. In this embodiment, the planar surface is devoid of perforations, meaning it is not a screen or has openings in the planar surface that would permit the target material to fall through. The mineral separation table is defined in x/y/z coordinates, wherein the planar surface is angled along a central axis (which can be seen as the fall-line). The planar surface is defined by angle $\alpha$ in a −z direction along the +x axis and angle $\beta$ in the −z direction along the +y axis. The mineral separation arrangement further comprises an electric motor, such as a Voice Coil Motor (VCM) that is connected to the mineral separation table. The electric motor is configured to vibrate the mineral separation table, which causes the target material to separate from the tailings. The separation table is configured to separate first particles, such as gold, from second particles, such as tailings, when the separation table is driven by the vibration. The first and the second particles are from a concentrated aggregate, which as mentioned above, the first particles have a higher specific gravity than the second particles. With respect to the vibration, the vibration corresponds to either a first vibration profile, a second vibration profile or a third vibration profile. The first vibration profile is defined by a plurality of first wave forms each having a primary half sine wave followed by a pause, wherein the pause having a pause time that is less than 0.1 of a half sine wave time. The second vibration profile comprises a plurality of second wave forms that each have the primary half sine wave followed by a plurality of high frequency sine waves. The plurality of high frequency sine waves comprises a frequency that is higher than the primary half sine wave and the plurality of high frequency sine waves comprise an amplitude that is lower than the primary half sine wave. The third vibration profile comprises a plurality of third wave forms each comprising the primary half sine wave that is at least partially superimposed with the plurality of high frequency sine waves. The mineral separation arrangement further comprises a controller that is connected to the electric motor. The controller comprises an output vibration signal that corresponds to at least one of the first, the second or the third vibration profiles.

Still, another embodiment of the present invention contemplates a mineral separation apparatus comprising a separation table that is defined in x/y/z axes. The separation table comprising a planar surface that is angled in a −z direction along the +x axis at an angle $\alpha$ and in the −z direction along the +y axis at an angle $\beta$. The mineral separation apparatus also includes a voice coil motor that is responsive to a first or second vibration profile received by a controller. The vibration profiles are configured to cause the motor to vibrate the mineral separation table with the vibration profiles, which causes aggregate to separate by differences in specific gravity. The first vibration profile is defined by a plurality of primary half sine waves each followed by a pause, wherein the pause has a pause time that is less than 0.15 of a half sine wave time. The second vibration profile is defined by the plurality of the primary half sine waves and a plurality of high frequency sine waves, wherein the high frequency sine waves comprise a frequency that is higher than the primary half sine wave.

In yet another embodiment of the present invention, a mineral separation device is envisioned comprising general components that include a mineral separation table an electric motor, and controller. The mineral separation table can comprise a planar surface that is angled in a −z direction along an +x axis at an angle $\alpha$ and in the −z direction along a +y axis at an angle $\beta$ as defined in x/y/z coordinates. The electric motor is configured to generate a vibration in the mineral separation table, wherein the vibration is in a primary direction that is in plane with the planar surface. The vibration, as applied to the planar surface, is configured to separate aggregate into first particles and second particles when on the mineral separation table. The vibration corresponds to a first vibration profile or a second vibration profile. The first vibration profile is defined by a plurality of primary half sine waves each followed by a pause, wherein the pause has a pause time that is less than 0.15 of a half sine wave time. The second vibration profile is defined by the plurality of the primary half sine waves and a plurality of high frequency sine waves, wherein the high frequency sine waves comprise a frequency that is higher than the primary half sine wave. The controller is configured to provide the vibration profiles to the electric motor.

BRIEF DESCRIPTION OF THE DRAWINGS

FIGS. 1A and 1B are line drawings that illustratively depict a separation table consistent with embodiments of the present invention;

DETAILED DESCRIPTION

Figure 1A:
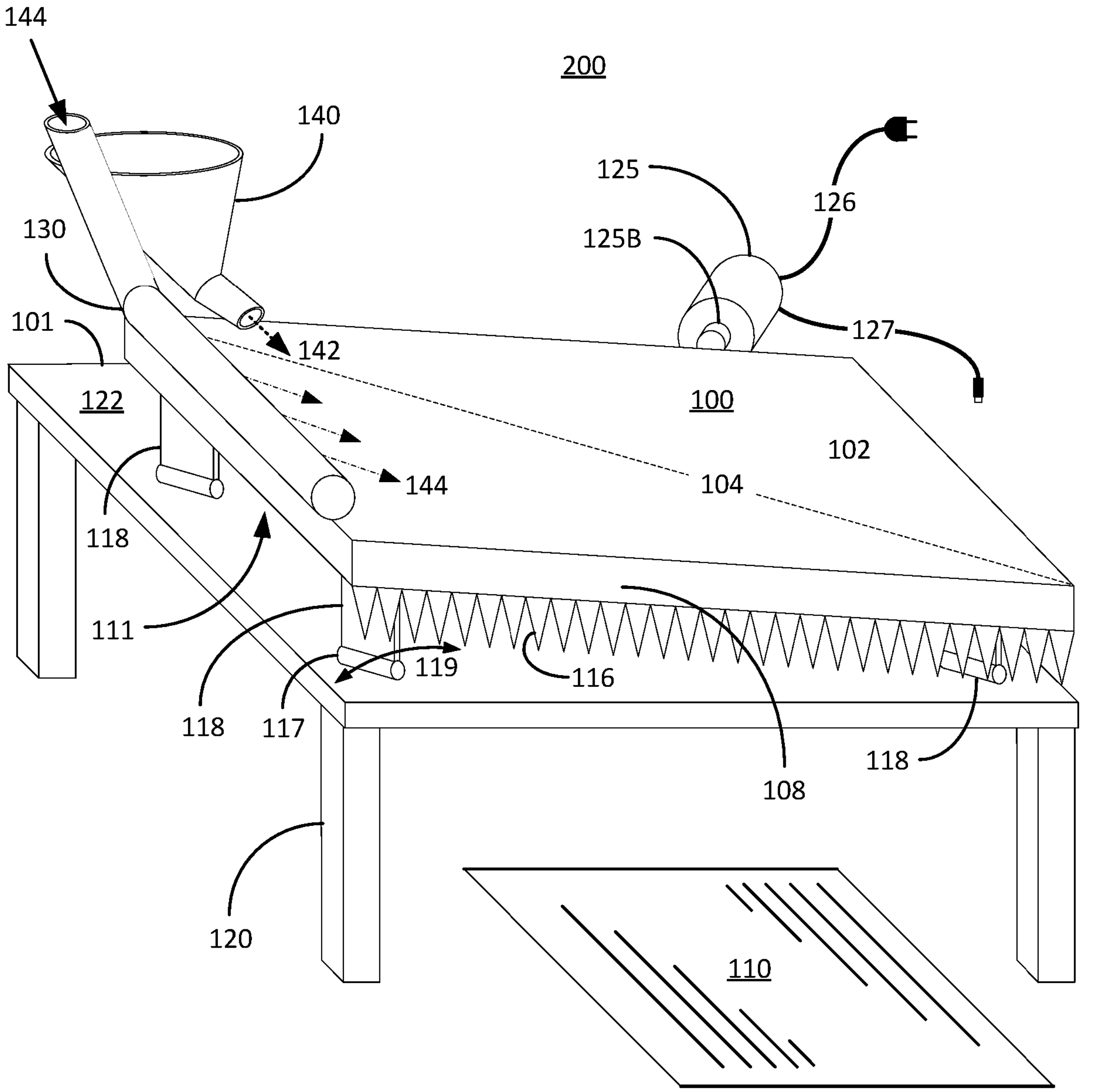
FIG. 1A is a line drawing of a transport and He-3 detector embodiment consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to separating target particles from discard particles in an aggregate by specific gravity using tailored frequencies in a mineral separation table. More specifically, a mineral separation arrangement comprising a separation table defined in x/y/z axes comprises a planar surface that is angled in a −z direction along the +x axis at an angle $\alpha$ and in the −z direction along the +y axis at an angle $\beta$. This apparatus further includes a motor that is responsive to a first or second vibration waveform (each having a different vibration profile) received by a controller. The vibration waveforms are configured to cause the motor to vibrate the mineral separation table, which causes aggregate disposed on the table to separate by differences in specific gravity. The first vibration waveform (the primary waveform) is defined by a plurality of primary half sine waves each followed by a pause, wherein the pause has a pause time that is less than 0.15 of a half sine wave time. The second waveform is defined by the primary waveform (the plurality of the primary half sine waves) and a sub-waveform, which is defined by a plurality of high frequency sine waves, wherein the high frequency sine waves have a higher frequency than the primary waveform.

Certain embodiments of the present invention contemplate using a primary waveform to generate motion of slurry containing target material that is desirable to mine. The primary waveform is preferably in, or along, the primary axis of the mineral separation table.

Some embodiments of the present invention contemplate the importance of stratification of the slurry in the −z direction, which deviates from historical mineral processing, which focus on motion solely in the primary axis. Accordingly, any motion in the −z axis is an unintended by-product of the primary axis motion, which is devoid of any engineered wave profile.

Hence, it is one object of the present invention to generate a separate and distinct waveform in the −z direction of the table to enhance stratification of solids.

In one embodiment, superposition of multiple waveforms into a single compound waveform is accomplished electronically using a voice coil motor.

Stratification can be further managed by integrating an orthogonal waveform to the primary waveform/motion of the table, some other angled waveform relative to the primary waveform or a parallel waveform to the primary waveform, depending on the desired outcome for a particular application.

There are benefits to a user being able to see the change in segregation performance of the slurry by tuning the compound or primary waveform 'on the fly' (real-time). The segregation performance is further influenced by a number of parameters including slurry feed rate to the table, amount of gangue discharged (reporting to number 1 discharge), amount of target mineral reporting to non-desirable discharge of the table.

Embodiments of the present invention envision a primary waveform defined as a single wave that is the dominant waveform. It has a relatively high amplitude and relatively low frequency compared to other waveforms that may coexist with the primary waveform. Certain embodiments envision the primary waveform as a 'half-sine' or 'sawtooth' pattern. Individual pulses of the primary waveform may be consecutive, following each other immediately or there may be a pause between each pulse. Any compound wave will have multiple frequencies combined therein. Certain waveforms comprise 'corners' at the bottom of a half sine, which are inherently higher in frequency. The 'corners' are an artifact of the half-sine wave and are not intentionally designed as an independent wave.

A second waveform is defined as an additional independent waveform. It has its own characteristics of amplitude, frequency, and wave shape. Though secondary waves, such as resonances, harmonics and sub-harmonics, exist in all mechanical systems, especially in worn out or loose mechanical systems. they are not intentional and therefore clearly differentiate from the intention compound waveforms of the present invention.

A sub waveform is defined herein as any waveform that is a component of the compound waveform. Accordingly, a compound waveform as described herein can be viewed having a primary waveform, a secondary waveform, a tertiary waveform and any other number of sub waveforms. In an analogous example, a guitar cord involving 6 strings generates a compound waveform that can be separated into its components electronically by using 'band-pass' or high or low frequency cut off filter(s). When filtering electronically, the individual notes, or sub-waveforms, can be isolated revealing a compilation of continuous independent waveforms. Likewise, any sub-waveform can be electronically input to the VCM, which ultimately drives the table in a manner allowing an end user to see the effects on the motion of the slurry on the table associated with each sub-waveform. Hence, any sub-waveform can be isolated and independently put into the VCM to drive the table providing visual feedback of the effects on segregating slurry to the user.

It should be noted that certain extraneous waveforms that may show up on an oscilloscope having the same frequency as the primary waveform but a different amplitude is not a secondary waveform because it cannot be isolated using electronic filters. If this waveform provides no beneficial motion of the slurry beyond what is already provided by the primary waveform, it is not an intentional waveform because provides no useful motion.

As discussed, a compound waveform is made up of sub-waveforms that intentionally move slurry dispensed on the table differently when applied individually. Hence, certain concepts described below involve compound waveforms parallel to the primary motion of the table as well as intentional and isolate-able motion in any direction.

It is understood that all mechanical motion has an off-axis component. If this component cannot be shown to be useful when isolated, then it is not considered 'intentional' of a sub-waveform.

Because the sub waveforms can be modified independently and the resulting performance of each change can be assessed by the user in while in the field mining target material, such as gold. Modifications of each sub-waveform can be made to at least the amplitude, frequency shape, and position relative to the other sub-waveforms within the compound waveform.

Figure 1B:
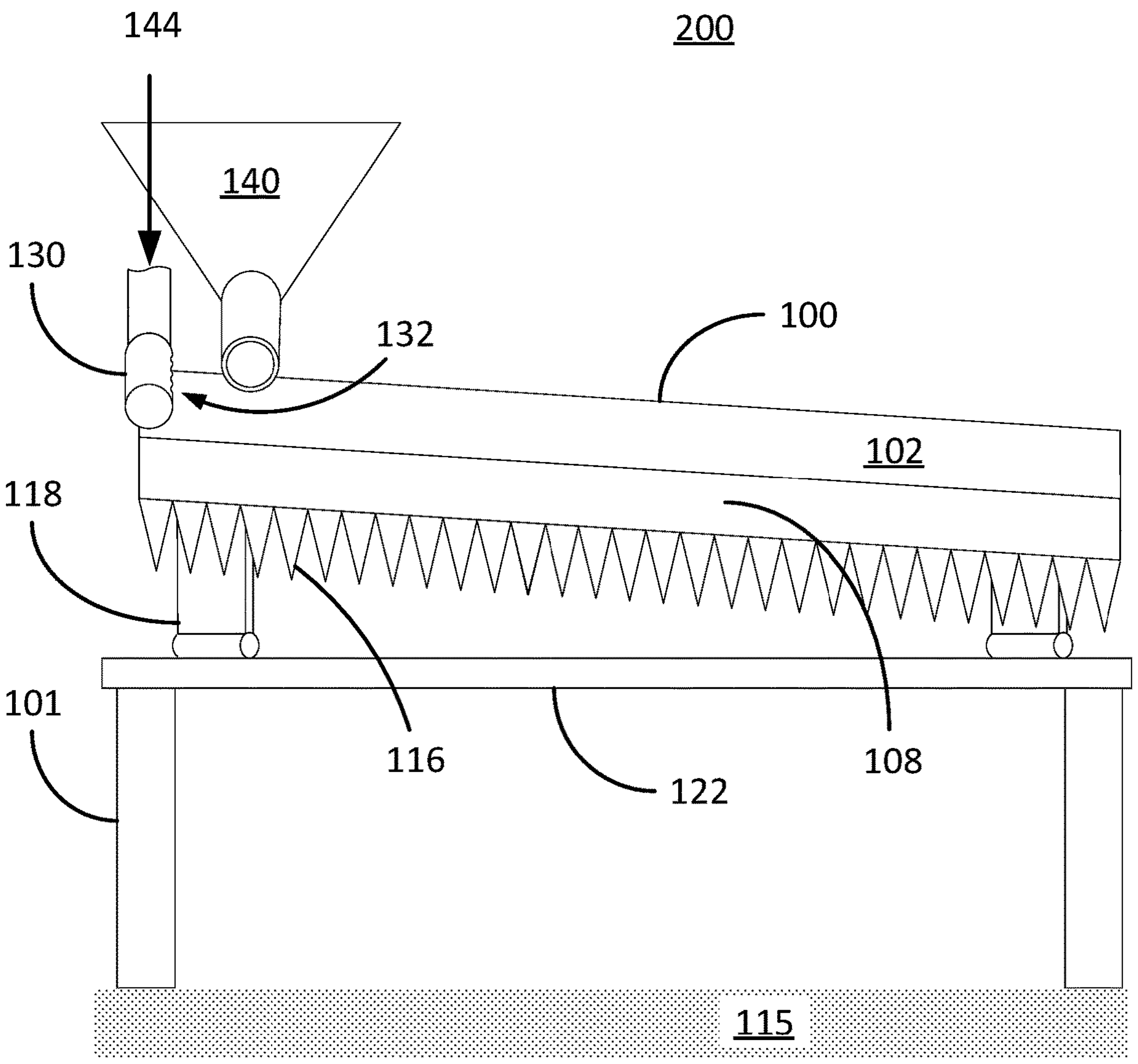

FIGS. 1A and 1B are line drawings that illustratively depict a separation table consistent with embodiments of the present invention. FIG. 1A is an isometric view of the separation table arrangement 200 featuring a mineral separation table 100 connected to a stand 101 by way of flexure supports 118. The flexure supports 118 are configured to rotate about the fixed hinge 119 along an are path 117, as depicted. In this embodiment, the stand 101 comprises a frame 122 supported by 4 legs 120. The stand 101 is intended to rest on top of the ground providing stability (i.e., the stand 101 is essentially an unmoving/rigid support) against the vibration motion of the mineral separation table 100 when in operation. The mineral separation table 100 is connected to the frame 122 via flexure supports 118, that in this embodiment are spring loaded hinge structures. Optional embodiments to the flexure supports 118 includes rubber supports, springs, linkages, a low durometer platform, or some other intermediate element interposed between the frame 122 and the mineral separation table 100 to contribute to the translation of motion imparted to the mineral separation table 100, as would be understood to those skilled in the art. In this embodiment, the flexure supports 118 are mounted to the frame 122 at one end 123 and the mineral separation table bottom 111 at the other end 124 (FIG. 3B). At least one electric motor 125 is connected to the mineral separation table 100 to vibrate or otherwise provide motion to the mineral separation table 100 while the frame 122 resists the vibration/motion. The motor 125 is depicted with a power cord 126 and a USB cable 127 to input one or more specific waveforms (vibration profiles) to the motor 125. The motor 125 in turn generates output vibrations to the mineral separation table 100 that correspond to the vibration waveforms. The mineral separation table 100 is tipped (positioned) relative to a horizontal plane 110, which represent level ground 115. The stand 101 is assumed to be resting on level ground 115 or at the least, adjusted with the frame 122 being parallel with the horizontal plane 110. An aggregate dispenser 140 located at the left of the table 100 is configured to dispense slurry/aggregate 142 on the table's planar surface 102, wherein the aggregate 142 migrates with the assistance of water 144 dispensed from a water supply line 130 to the drip channels 116 that extend from the drip edge 108.

FIG. 1B is a front view of the separation table arrangement 200 depicted in FIG. 1A. As shown here, the mineral separation table 100 is supported by the flexure supports 118. As also shown, the table's planar surface 102 is tipped towards the viewer and tilted downward to the left (in the −y direction). The frame 122 of the stand 101 is level on the ground 115. The water supply line 130 comprises water perforations 132 where water 144 is dispensed on the planar surface 102. The aggregate dispenser 140, the drip edge 108 and the drip channels 116 are shown here for reference.

Figure 2:
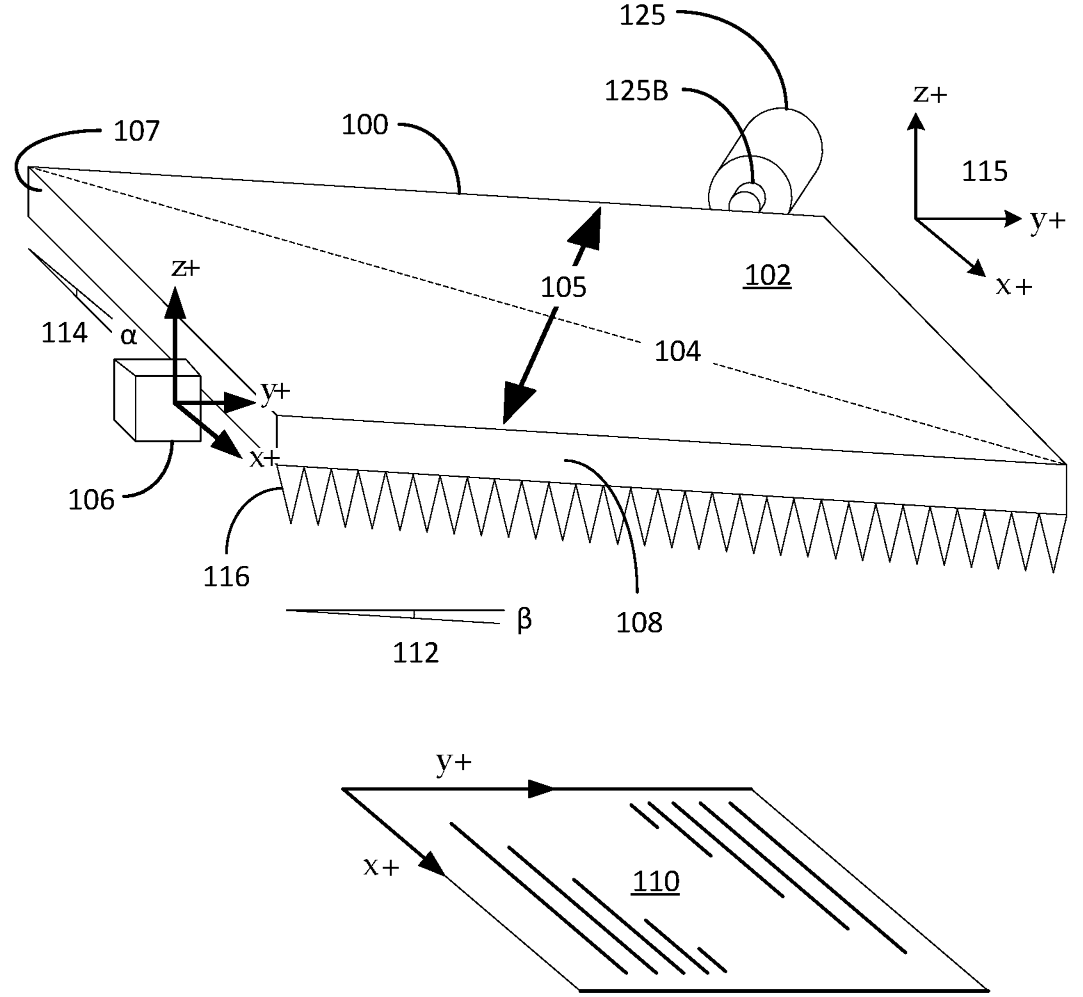
FIG. 2 is a line drawing isometric view of a mineral separation table embodiment consistent with embodiments of the present invention.

FIG. 2 is a line drawing isometric view of a mineral separation table embodiment consistent with embodiments of the present invention. As shown here, the mineral separation table 100 defines a central axis 104, which is the fall-line of the table's planar surface 102. The table's planar surface 102 is tipped towards the viewer and tilted downward to the left in the −z direction. More specifically, with reference to the horizontal plane 110 defined by the x-y axes of the x/y/z coordinates 115, the planar surface 102 is angled along the central axis 104 defined by angle $\alpha$ 114 in a −z direction along the +x axis and angle $\beta$ 112 in the −z direction along the +y axis. In this embodiment, the primary waveform (having the largest vibration amplitude), which in certain embodiments is generated by the primary motor 125 (and actuator 125B), is along and in the path of the primary waveform arrow 105. This embodiment also depicts a multi-axis motor 106 disposed on the table side 107, which can produce sub waveforms, i.e., secondary, tertiary, etc., waveform vibrations, in whatever direction an end user may want/input. The drip edge 108 and the drip channels 116 are shown here for reference. Certain embodiments contemplate the mineral separation table 100 being devoid of any perforations, meaning it is not a screen and does not let through the aggregate 142, which comprise particles of different specific gravities.

Figure 3A:
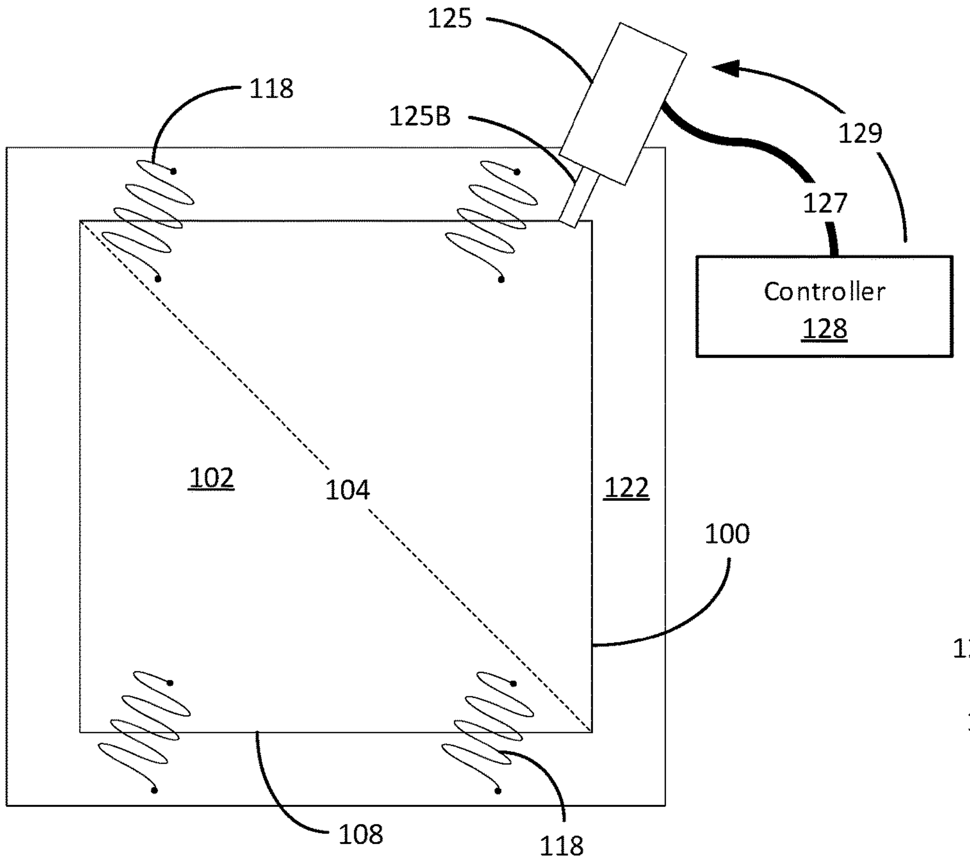
FIGS. 3A-3F are block diagrams of the mineral separation table in action consistent with embodiments of the present invention.
Figure 3B:
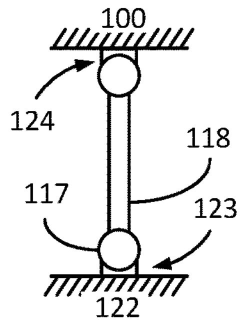

FIGS. 3A-3F are block diagrams of the mineral separation table in action consistent with embodiments of the present invention. FIG. 3A is a block diagram of the mineral separation table 100 in a neutral state 135 with the flexure supports 118 (depicted here as springs) also in a neutral state (neither stretched nor compressed). The motor plunger 125B of the motor 125 is also in a neutral state. A controller 128 is communicatively linked or otherwise connected to the electric motor 125, wherein the controller 128 is configured to interface with a controlling entity (such as, human via a computer or AI running on the computer) that inputs waveforms (weather a primary waveform or a compound waveform) 128 of a desired motion to the motor 125, such as via the communications cable 127. It should be appreciated that communication between the controller 128 and the motor 125 can be wireless or wireline, as shown. The mineral separation table 100 depicts the central axis 104 relative to the planar surface 102. FIG. 3B further depicts a flexure support 118 of FIG. 1A attached at a first end 123 to the frame 122 and at a second end 124 to the mineral separation table 100 via the hinges 119.

Figure 3C:
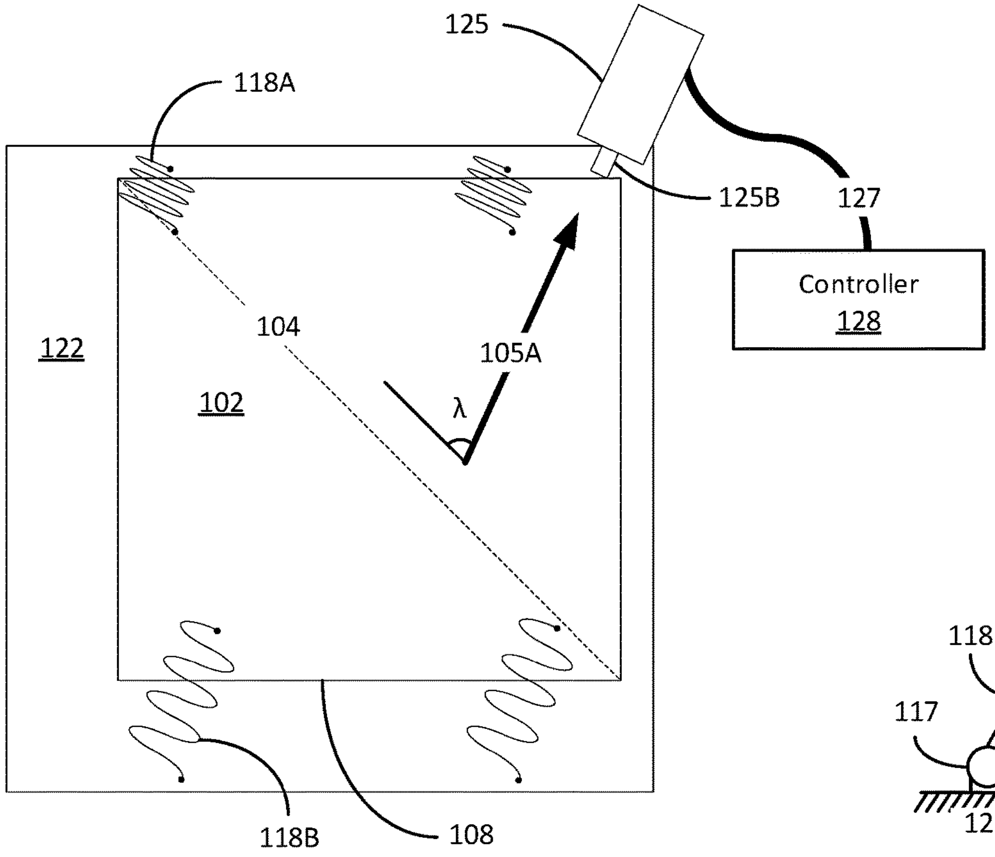
Figure 3D:
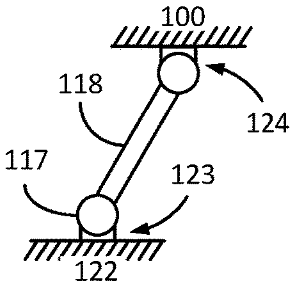

FIG. 3C illustratively depicts the mineral separation table 100 in a first displacement (retracted) state 136 with the flexure supports 118 in a first flexed state. The motor plunger 125B of the motor 125 is in a retracted orientation 136 pulling the flexures 118 towards the motor 125. In turn, the planar surface 102 is moved in the direction of the primary waveform arrow 105A relative to the frame 122. The primary waveform arrow 105A is the direction of the primary motion (waveform) of the mineral separation table 100, meaning it is the waveform with the largest amplitude. The primary waveform arrow 105A is at an angle λ from the central axis 104. In this embodiment the angle λ is between 60° and 120°, however other angles are contemplated depending on the aggregate 142 being segregated. In this embodiment, the upper springs 118A are compressed while the lower springs 118B are stretched. In this embodiment, the motor 125 is responsive to waveform (weather primary only or compound) input information received from the controller 128. FIG. 3D depicts the flexure support 118 having the second end 124 moved along with the mineral separation table 100 to the right relative to the first end 123 that is attached to the frame 122.

Figure 3E:
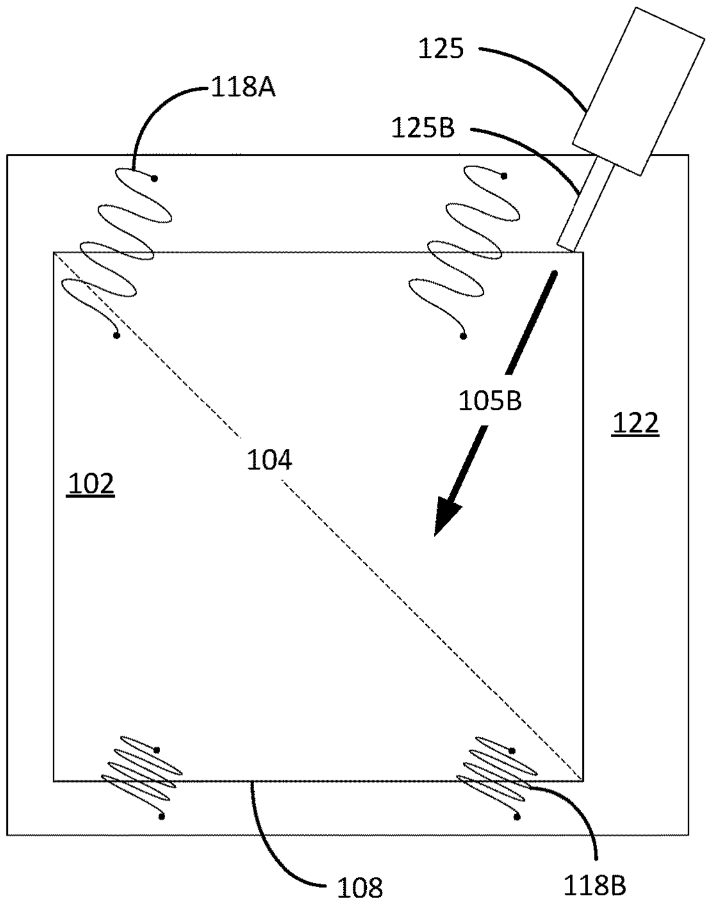
Figure 3F:
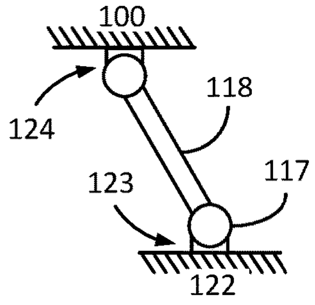

FIG. 3E illustratively depicts the mineral separation table 100 in a second displacement (extended) state 137 with the flexure supports 118 in a second flexed state. The motor plunger 125B of the motor 125 is in an extended orientation 136 pushing the flexures 118 away from the motor 125. In turn, the planar surface 102 is moved in the direction of the primary waveform arrow 105B relative to the frame 122. The primary waveform arrow 105B is along the same path as the primary waveform arrow 105A but in the opposite direction. In this embodiment, the upper springs 118A are stretched while the lower springs 118B are compressed. Obviously, the repeated retracted and extended states 136 and 137 impose or otherwise cause the vibration to the mineral separation table 100. FIG. 3F depicts the flexure support 118 having the second end 124 moved along with the mineral separation table 100 to the left relative to the first end 123 that is attached to the frame 122.

As previously discussed, in one embodiment of the present invention, the primary waveform is imposed on the mineral separation table 100 in a direction 105 at an angle λ, however in other embodiments, optional different angles can be employed. Moreover, the mineral separation table 100 can be driven with other waveform vibrations in any direction using additional motors. For example, the primary waveform 105 may consist of longitudinal oscillation residing along the planar surface 102 and yet additional sub waveforms may reside in the same primary waveform direction 105 or in different directions (at different angles) in plane 110 with the planar surface 102 or out of plane with the planar surface 102.

Figure 4A:
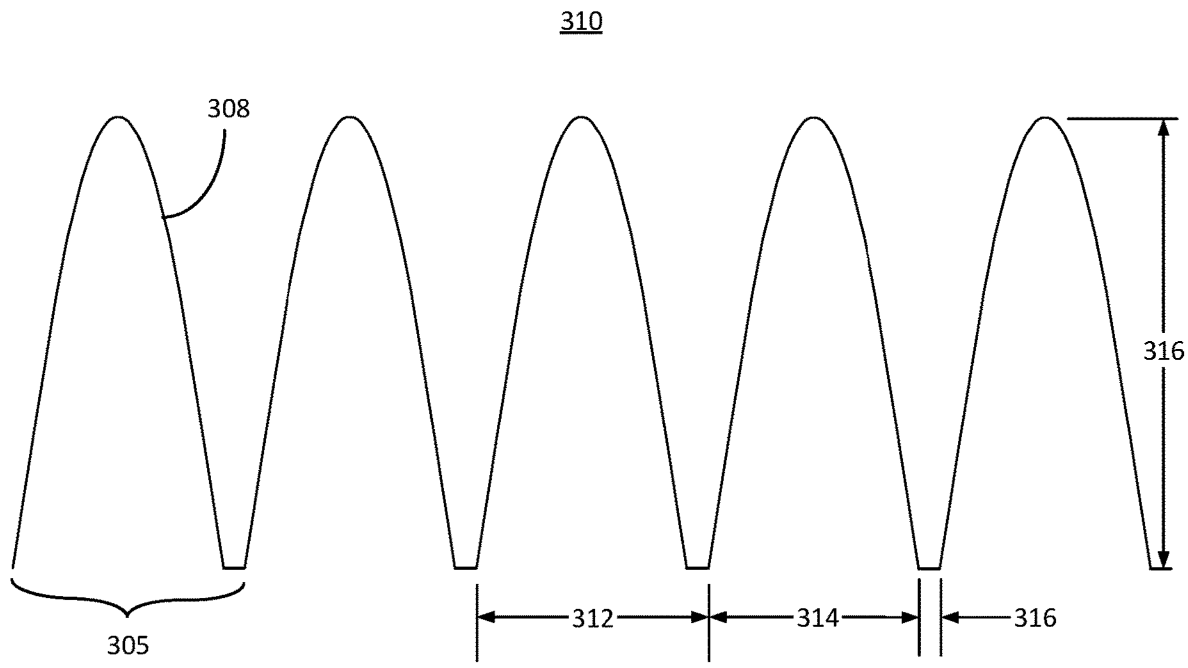
FIGS. 4A-4E depict vibration plots of different families of vibration profiles consistent with embodiments of the present invention.

FIGS. 4A-4D depict waveform plots of different families of waveform profiles consistent with embodiments of the present invention. FIG. 4A is a plot of a first wave train embodiment 310 of a primary waveform, which is made up of a plurality of simple half sine pulse waveforms (primary waveform pulse) 305. Each primary waveform pulse 305 is defined by a half sinusoidal wave 308 having a pulse length (T) 314 and a pause 316. Each a pulse 305 is defined by a duty cycle of greater than 85%. The duty cycle (of the first wave train 310) is defined by the ratio between a single pulse length (T) 314 and the period 312, wherein the period 312 is defined by the pulse length (T) 314 and the pause 316. Some embodiments contemplate a primary waveform comprising essentially no pause 316 between the half sinusoidal waves 308. Hence, in view of FIGS. 2 and 3A-3F, the motor 125 pulses the mineral separation table 100 with the primary waveform pulse train 310 along the primary waveform direction 105 over an operational duration of time, such as over minutes, hours or even days. The controller 128 inputs a waveform profile 129 (by a user) that corresponds to the primary waveform pulse train 310 to the motor 125 thereby instructing the motor 125 to vibrate with the primary waveform pulse train 310. The motion of the primary waveform pulse train (first wave train) 310 imparted on the mineral separation table 100 separates aggregate 142 dispensed on the planar surface 102 by specific gravity. From a mechanics perspective, the momentum generated for a given pulse 305 will move a high specific gravity particle 230 less than a low specific gravity particle 232 thereby separating the aggregate particles by their specific gravity, see FIG. 5. The water 144 helps shuttle or otherwise move the particles along the planar surface 102 towards the table's drip edge 108. In this way, the pulses 305 separate the high specific gravity particles 230 from the low specific gravity particles 232 of the aggregate 142. Due to the angle of the planar surface 102, the aggregate migrates towards the +x and +y directions (from the far left towards the central axis/fall line 104) with the low specific gravity particles 232 moving more to the +y direction than the high specific gravity particles 230, as shown in FIG. 5.

Figure 4B:
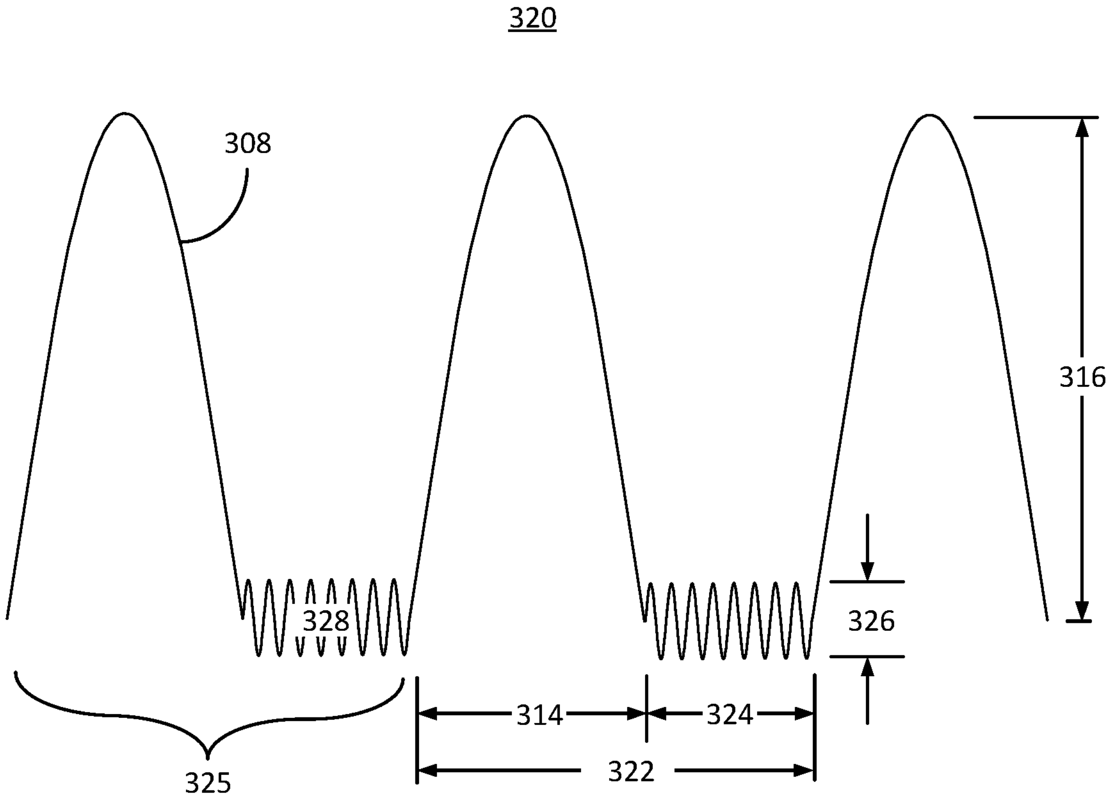
Figure 5:
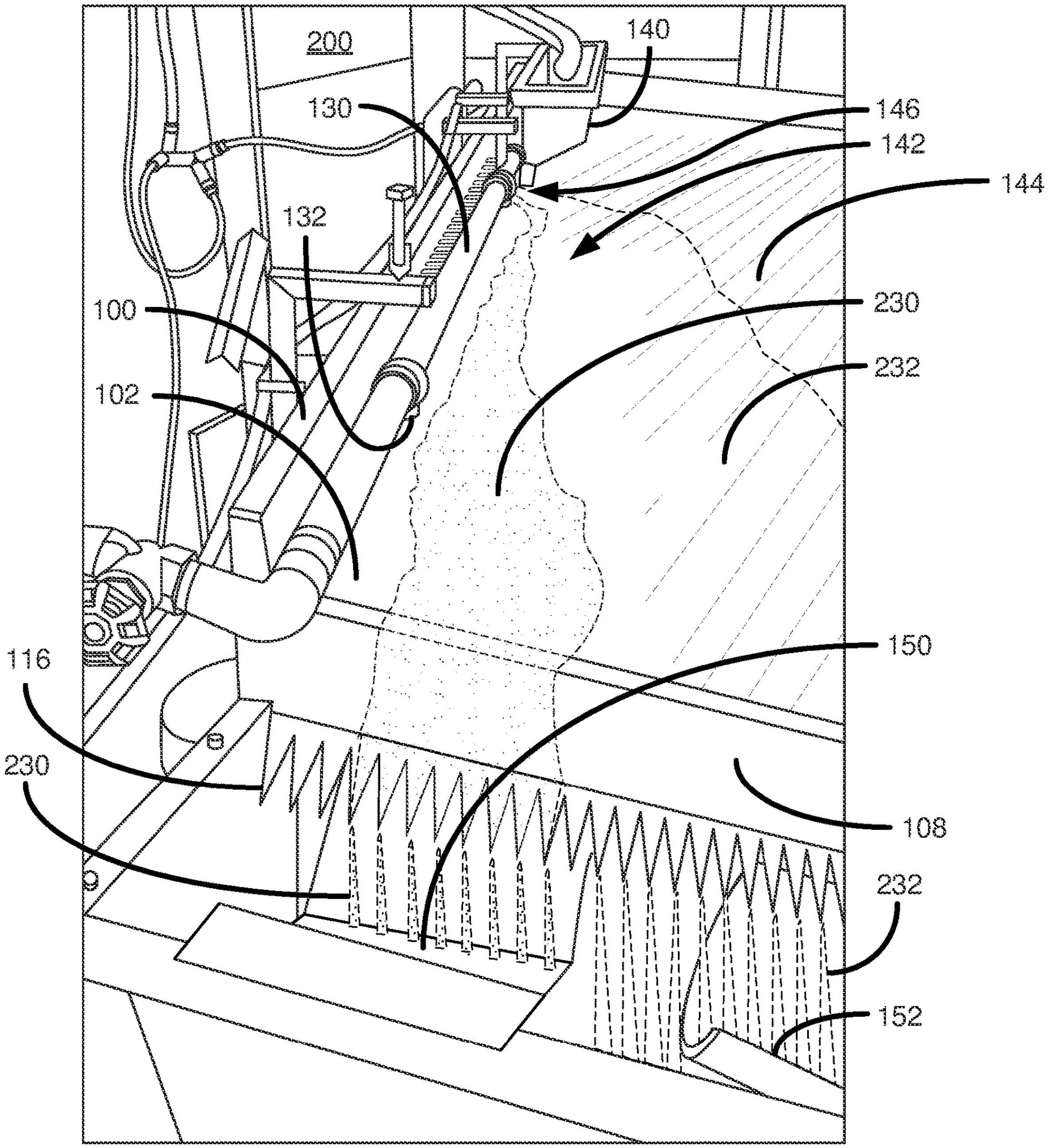
FIG. 5 is a line drawing illustratively depicting an embodiment of the separation table arrangement separating the aggregate consistent with embodiments of the present invention.

FIG. 4B is another waveform plot of a second wave train embodiment 320 consistent with embodiments of the present invention. The second wave train embodiment 320 comprises a plurality of pulses 325 each defined by a primary waveform 310 comprising a primary half sine wave 308 followed pause 316 with a plurality of high frequency sine waves 328 that have a low amplitude 326 superimposed in the pause 316. More clearly, the primary half sine wave 308 has a high amplitude 316 (and low frequency) while the high frequency sine waves 328 are at a low amplitude 326. The high amplitude 316 is higher than the low amplitude 326 and the high frequency is higher than the low frequency. Some embodiments envision the low amplitude 326 being in a range between 5% and 50% of the high amplitude 316. In the present embodiment, the low amplitude 326 is 15% of the height of the high amplitude 316. Though, in this embodiment, each primary half sine wave 308 is separated by eight high frequency sine waves 328, the number of high frequency sine waves 328 can be more or less than eight in relation to every primary half sine wave 308, which may change the efficiency of the high and low specific gravity particle 230 and 232 separation. The efficiency is defined as the percentage of the aggregate 142 separated by the time the high and low specific gravity particles 230 and 232 make it to the drip edge 108. Hence, a high efficiency waveform profile will produce a higher percentage of separated particles at the drip edge 108 than a low efficiency waveform profile. As shown here, the duty cycle of the second wave train 320 is about 60%, however other duty cycles between 10%-90% are contemplated. Here the duty cycle of the second wave train 320 is defined by the ratio between a single pulse length (τ) 314 and the period 322, wherein the period 322 is defined by the pulse length (τ) 314 and the high frequency duration 324. The primary half sine wave 308 is envisioned to be energized along the primary waveform direction 105 with the high frequency sine waves 328 either along the primary waveform direction 105 or in a different direction along any one of or combination of the x/y/z coordinates 115. The high frequency sine waves 328 can be generated by the motor 125 or by a secondary motor (such as the multi-axis motor 106) also connected to the mineral separation table 100.

Figure 4C:
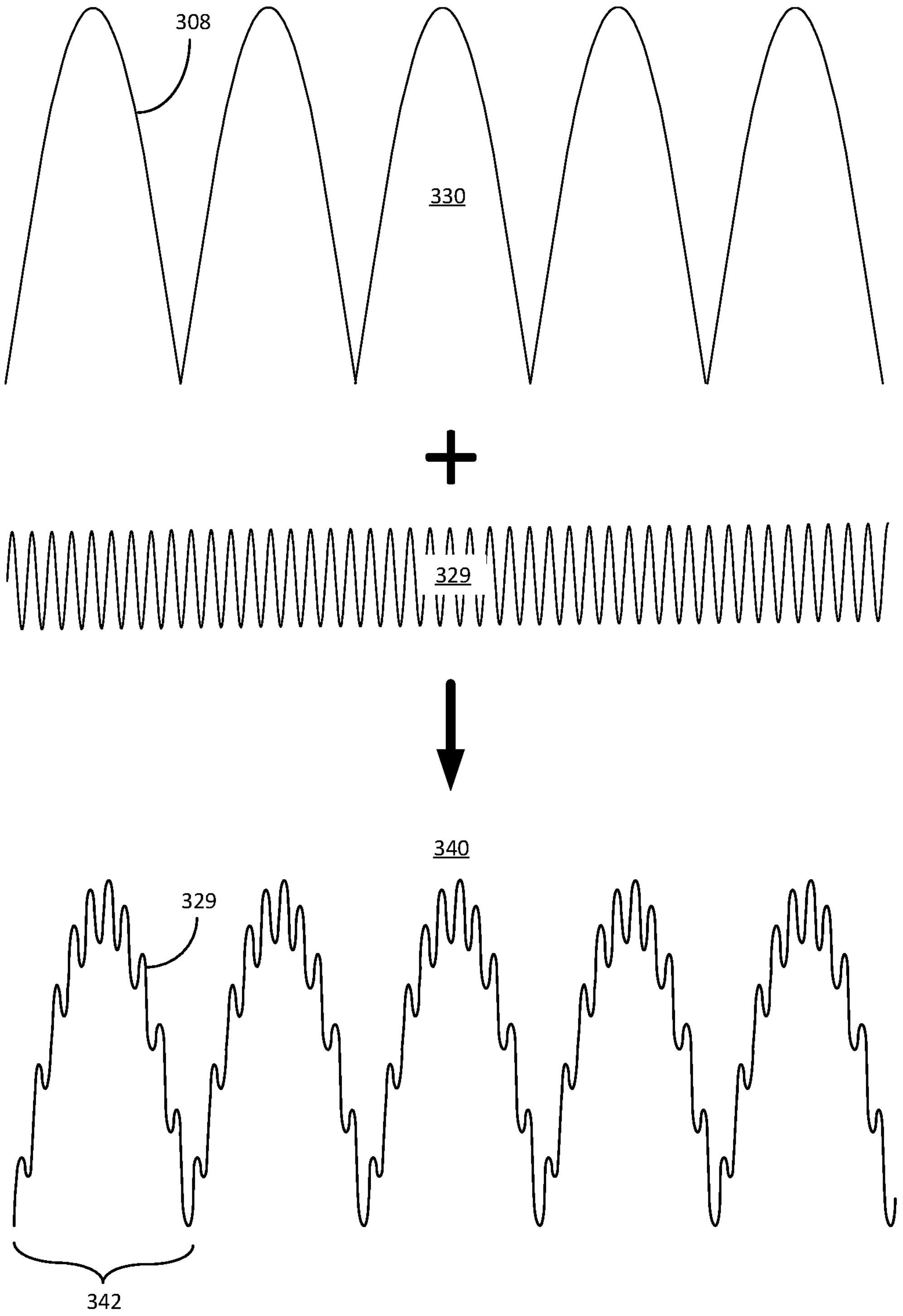

FIG. 4C is another waveform plot of a third wave train embodiment 340 consistent with embodiments of the present invention. The third wave train embodiment 340 is a compound waveform of a primary waveform 320 comprising a plurality of half sinusoidal waves 308 (that are low frequency and high amplitude) superimposed (added) a sub waveform defined by the high frequency sine waves 329 (that are higher frequency and lower amplitude compared with the half sinusoidal waves 308 of waveform 320). The superimposed waveforms 320 and 329 that make up the compound waveform 342 is shown under the arrow. Though the present combination waveform 342 has duty cycle that is essentially 100%, other duty cycles are envisioned with the sub waveform 329 superimposed over the primary waveform 320 with a solo high frequency duration 324 between the overlayed waveform 342. Optionally, pauses or some combination thereof can be employed within the scope and spirit of the present invention. The embodiments of FIG. 4C envision the amplitude and frequency relationship between the sub waveform 329 and the primary wave form 320 being consistent with that described in conjunction with the sub waveform 328 in FIG. 4B. The primary waveform 320 is envisioned to be energized along the vibration direction 105 with the high frequency sine waves 329 either along the primary waveform direction 105 or in a different direction along any one of or combination of the x/y/z coordinates 115. The sub waveform 329 can be generated by the motor 125 or by a secondary motor (such as the multi-axis motor 106) also connected to the mineral separation table 100.

Figure 4D:
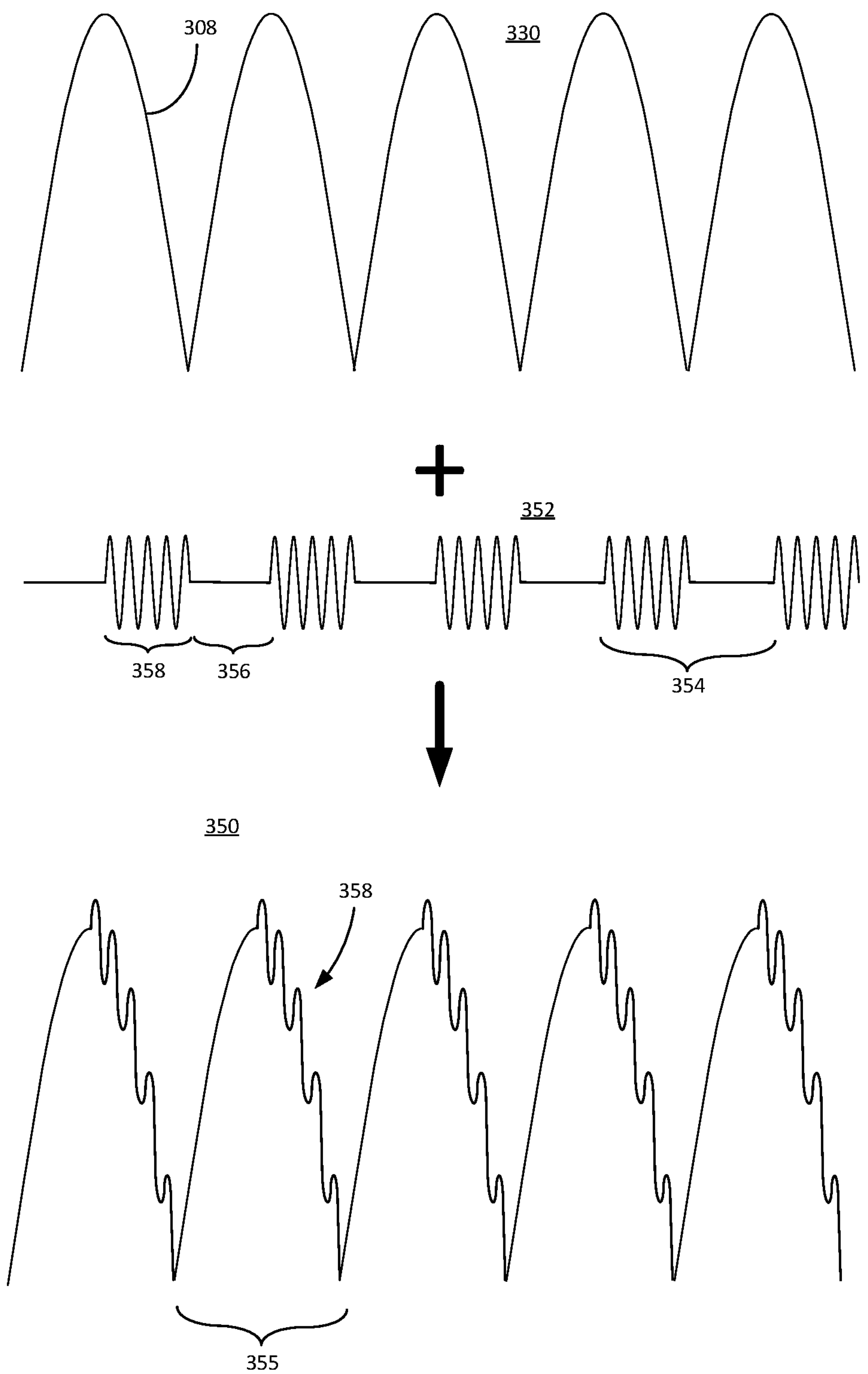

FIG. 4D is another waveform plot of a fourth wave train embodiment 350 consistent with embodiments of the present invention. The fourth wave train embodiment 350 is a compound waveform 350 of a primary waveform 320 comprising a plurality of primary half sine waves 308 (as previously discussed are low frequency and high amplitude) superimposed (added) with an intermittent high frequency cycle wave train 352, wherein each waveform 354 comprises a burst of the high frequency sine waves 358 followed by a pause 356. The superimposed waveforms 320 and 552 that make up the compound waveform wave 355 of the compound wave train 350 is shown under the arrow. Specifically, the combination waveform 355 has a (smooth) first half of the primary half sine wave 308 from the primary waveform 330 and a second half 308 superimposed with the high frequency sine waves 358. Though the present combination waveform 355 has a primary half sine wave duty cycle that is essentially 100%, other duty cycles are envisioned with the high frequency sine waves 358, pauses or some combination thereof. The embodiments of FIG. 4D envision the amplitude and frequency relationship between the high frequency sine waves 358 and the half sine waves 308 being consistent with the high frequency sine waves 328 described in FIG. 4B. The primary waveform 330 is envisioned to be energized along the primary waveform direction 105 with the high frequency sine waves 358 either along the vibration direction 105 or in a different direction along any one of or combination of the x/y/z coordinates 115. The sub waveform 358 can be generated by the motor 125 or by a secondary motor (such as the multi-axis motor 106) also connected to the mineral separation table 100.

Figure 4E:
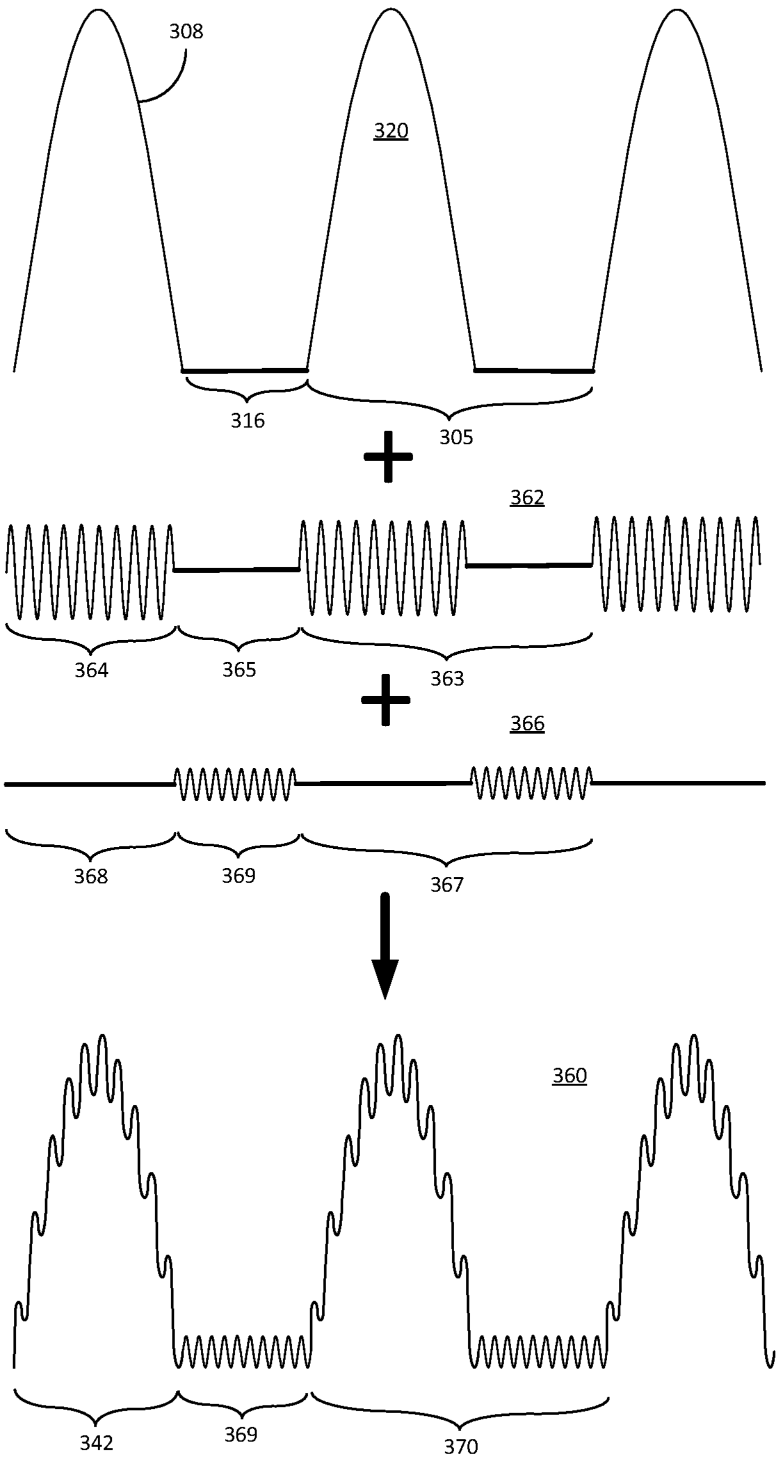

FIG. 4E is another waveform plot of a fifth wave train embodiment 360 consistent with embodiments of the present invention. The fifth wave train embodiment 360 is a compound wave train comprised of waveforms of the primary wave form 305, a secondary waveform 363 and a tertiary waveform 367. The primary wave train 320 comprises a plurality of primary half sine waves 308 each followed by a pause 316. The secondary waveform 363 comprises a burst of the high frequency sine waves over a time period 364 followed by a pause 365. The burst of the high frequency sine waves 364 coincides with each primary half sine wave 308. This is combined with yet a tertiary waveform 367 (which in this embodiment has the lowest amplitude vibrations and is the inverse of the secondary wave train 362) that comprises a pause 368 followed by a burst of secondary high frequency sine waves 369. The superimposed wave trains 320, 362 and 366 comprise the fifth wave train embodiment 360, which is envisioned to have many of the options discussed above in conjunction with FIGS. 4A-4D.

In certain embodiments, the mineral separation table 100 could be vibrating with a first waveform and then change to a second waveform. Accordingly, the families of waveforms could be mixed and matched as well as shift from one to another after a period of time either after predetermined time intervals or 'on the fly' as desired.

FIG. 5 is a line drawing illustratively depicting an embodiment of the separation table arrangement 200 separating the aggregate consistent with embodiments of the present invention. The separation table 200 (also considered a finishing table) is shown with part of the mineral separation table 100, drip edge 108 and drip channels 116. Aggregate 142 is shown being dispensed from the aggregate dispenser 140 on the planar surface 102 of the mineral separation table 100. Water 144 is dispensed via water perforations 132 from the water supply line 130 along the left side of the table 100. As the mineral separation table 100 is vibrated via the motor 126 and possibly 106, the higher specific gravity particles 230 separate from the lower specific gravity particles 232. In one working example, the aggregate 142 is made up of line gold 230 and tailings particles 232, such as silt/dust, which is typically below 100 microns in diameter. Both the gold 230 and the tailings 232 migrate from the aggregate dispensing location 146 (where the arrow is) the towards the drip edge 108 and the right side of the table 100, as shown. The tailings 232 is considered discard or waste material, such as quartz, feldspars and mica, for example. The targeted gold dust 230 is shown dripping over the drip edge 108 to the left, along the drip channels 116 and into a collecting trough 150 where the gold dust 230 can be processed. The tailings 232 is shown dripping over the drip edge 108 to the right, along the drip channels 116 and into a tailings collection trough 152 where the tailings 132 can be discarded.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envisions a mineral separation arrangement 200 having a mineral separation table 100, as shown in FIG. 2, that is made to vibrate in order to separate out target materials based on different specific gravities. In one embodiment, gold is separated out from earth tailings by way of vibrating a planar surface 102 of the mineral separation table 100. In this embodiment, the planar surface is devoid of perforations, meaning it is not a screen or has openings in the planar surface 102 that would permit the target material to fall through. The mineral separation table 100 is defined in x/y/z coordinates 115, wherein the planar surface 102 is angled along a central axis 104 (which can be seen as the fall-line). The planar surface 102 is defined by angle $\alpha$ in a $-z$ direction along the $+x$ axis and angle $\beta$ in the $-z$ direction along the $+y$ axis. The mineral separation arrangement 200 further comprises an electric motor 125, such as a Voice Coil Motor (VCM) that is connected to the mineral separation table 100. The electric motor 125 is configured to vibrate the mineral separation table 100, which causes the target material to separate from the tailings. The separation table 100 is configured to separate first particles 230, such as gold, from second particles 232, such as tailings, when the separation table 100 is driven by the vibration. The first and the second particles are from a concentrated aggregate 142, which as mentioned above, the first particles 230 have a higher specific gravity than the second particles 232. With respect to the vibration, the vibration corresponds to either a first vibration profile 310, a second vibration profile 320 or a third vibration profile 340, or some subset combination of the three, as shown in FIGS. 4A-4E. The first vibration profile 310 is defined by a plurality of first wave forms 305 each having a primary half sine wave 308 followed by a pause 316, wherein the pause 316 having a pause time 316 that is less than 0.1 of a half sine wave time 314. The second vibration profile 320 comprises a plurality of second wave forms 325 that each have the primary half sine wave 308 followed by a plurality of high frequency sine waves 328. The plurality of high frequency sine waves 328 comprise a frequency that is higher than the primary half sine wave 308 and the plurality of high frequency sine waves 328 comprise an amplitude that is lower than the primary half sine wave 308. The third vibration profile 320 comprises a plurality of third wave forms 342 each comprising the primary half sine wave 308 that is at least partially superimposed with the plurality of high frequency sine waves 328. The mineral separation arrangement 200 further comprises a controller 128 that is connected to the electric motor 125. The controller 128 comprises an output vibration signal 129 that corresponds to at least one of the first, the second or the third vibration profiles 310, 320, 340.

In an embodiment of the mineral separation arrangement 200, the central axis 104 is further contemplated to be adjustable along the x, the y and the z axes 115.

The mineral separation arrangement 200 further envisions that the mineral separation table 100 comprising drip channels 116 along a drip edge portion 108 of the mineral separation table 100.

The mineral separation arrangement 200 can further comprising a water dispenser 130 that is configured to dispense water 144 on the separation table 100 and a concentrated aggregate dispenser 140 that is configured to dispense the concentrated aggregate 142 on the separation table 100.

The third vibration profile 350 of the mineral separation arrangement 200 is further envisioned to comprise the high frequency sine waves 328 superimposed over a trailing edge 360 of the primary half sine wave 308.

Some embodiments of the mineral separation arrangement 200 envision the controller 128 comprising a user interface, such as a computer, key board, touch screen, wirelessly connected personal handheld device (such as a cell phone), etc., that is configured to receive instructions from a user, such as a person, a feedback system that relies on sensing the efficiency of the separation versus the time it is taking, artificial intelligence weighing separation efficiency versus time to separate, etc.

As mentioned above, certain embodiments envision the mineral separation arrangement wherein the high specific gravity particles 230 are gold and the low specific gravity particles 232 are tailings.

Certain embodiments of the present invention further contemplate the mineral separation arrangement 200 comprising flexure supports 118 that connect the mineral separation table 100 to a frame 122, wherein the frame 122 is essentially stationary while the mineral separation table 100 vibrates.

Some embodiments of the mineral separation arrangement 200 envision the electric motor 125 being a voice coil motor.

Some embodiments contemplate the mineral separation arrangement 200 further comprising pivot arms 118A and 118B connecting a frame 122 to an under side 111 of the separation table 100, the pivot arms 118A and 118B configured to accommodate the primary waveform vibration 105 of the separation table 100.

Some embodiments of the mineral separation arrangement 200 further envision the first vibration profile 310, the second vibration profile 320 and the third vibration profile 340 comprising a third vibration sequence 366, as exemplified in FIG. 4E.

One embodiment of the mineral separation arrangement 200 envisions the primary half sine wave 308 being in a first direction 105 in plane with the planar surface 102 and the plurality of high frequency sine waves 328 being in a second direction that is different form the first direction 105, wherein the second direction is defined in x/y/z coordinates 115.

In another embodiment of the mineral separation arrangement 200, the primary half sine wave 308 is envisioned being in a first direction 105 in plane with the planar surface 102, wherein the first direction 105 is offset by an angle $\lambda$ from the central axis 104.

Certain embodiments of the mineral separation arrangement 200 envision the primary half sine wave 308 being in a first direction 105 in plane with the planar surface 102, wherein the first direction 105 is essentially orthogonal to the central axis 104.

In yet another embodiment of the present invention, a mineral separation device 200 is envisioned comprising general components that include a mineral separation table 100, as shown in FIG. 2, an electric motor 125, and controller. The mineral separation table 100 can comprise a planar surface 102 that is angled in a −z direction along an +x axis at an angle α and in the −z direction along a −y axis at an angle β as defined in x/y/z coordinates 115. The electric motor 125 is configured to generate a vibration in the mineral separation table 100, wherein the vibration is in a primary direction 105 that is in plane with the planar surface 102. The vibration, as applied to the planar surface 102, is configured to separate aggregate 142 into first particles 230 and second particles 232 when on the mineral separation table 100. As shown in FIGS. 4A-4E, the vibration corresponds to a first vibration profile 310 or a second vibration profile 320. The first vibration profile 310 is defined by a plurality of primary half sine waves 308 each followed by a pause 316, wherein the pause has a pause time 316 that is less than 0.15 of a half sine wave time 314. The second vibration profile 320 is defined by the plurality of the primary half sine waves 308 and a plurality of high frequency sine waves 328, wherein the high frequency sine waves 328 comprise a frequency that is higher than the primary half sine wave 308. The controller 128 is configured to provide the vibration profiles 310 and 320 to the electric motor 125.

Some embodiments of the mineral separation device 200 envision the second vibration profile 320 being defined by a plurality of the primary half sine wave 308, each followed by a plurality of the high frequency sine waves 328.

The mineral separation device 200 is optionally envisioned wherein the second vibration profile 320 is defined by a plurality of the primary half sine waves 308 that are at least partially superimposed with the plurality of high frequency sine waves 328.

In some embodiments of the present invention, the plurality of high frequency sine waves 328 of the mineral separation device 200 can comprise an amplitude that is lower than the primary half sine wave 308.

The mineral separation device 200 further envisions that the second vibration profile 320 can further comprises a third frequency that is combined with the plurality of the primary half sine waves 308 and the plurality of high frequency sine waves 328.

Still, another embodiment of the present invention contemplates a mineral separation apparatus 200 comprising a separation table 100 that is defined in x/y/z axes 115. The separation table 100 comprising a planar surface 102 that is angled in a −z direction along the +x axis at an angle α and in the −z direction along the +y axis at an angle β. The mineral separation apparatus 200 also includes a voice coil motor 125 that is responsive to a first or second vibration profile received by a controller 128. Thea vibration profiles are configured to cause the voice coil motor 125 to generate a vibration corresponding to the vibration profiles in the mineral separation table 100, which causes aggregate 142 to separate by differences in specific gravity. The first vibration profile 310 is defined by a plurality of primary half sine waves 308 each followed by a pause 316, wherein the pause 316 have a pause time 316 that is less than 0.15 of a half sine wave time 314. The second vibration profile 320 is defined by the plurality of the primary half sine waves 308 and a plurality of high frequency sine waves 328, wherein the high frequency sine waves 328 comprise a frequency that is higher than the primary half sine wave 308.

In one option, the high frequency sine waves 328 are generated by a second motor 106, as shown in FIG. 2.

These exemplified embodiments are not exhaustive of the embodiments presented throughout the description, but rather are merely one example of a contemplated embodiment chain consistent with embodiments of the present invention. In other words, there are numerous other embodiments described herein that are not necessarily presented in the apparatus embodiment examples presented immediately above.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements, such as the motor, drip line, etc., can include other geometries not explicitly shown in the embodiments above while maintaining essentially the same functionality without departing from the scope and spirit of the present invention. Likewise, the materials and construction of the table, flexures, planar surface, frame can be different but serve the same purpose without departing from the scope and spirit of the present invention. It should further be appreciated that the vibration profiles can have different shapes while staying in the bounds of the primary ideas presented without departing from the scope and spirit of the present invention. Moreover, the electronics and computing that enable the functionality of the mineral separation arrangement are not described in detail because they either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A mineral separation arrangement comprising:

a mineral separation table comprising a planar surface that is devoid of perforations, as defined in x/y/z coordinates the planar surface is angled along a central axis defined by angle α in a −z direction along the +x axis and angle β in the −z direction along the +y axis;

an electric motor connected to the mineral separation table, the electric motor configured to vibrate the mineral separation table, the mineral separation table configured to separate first particles from second particles when the mineral separation table is driven by the vibration, the first and the second particles are from a concentrated aggregate, the first particles have a higher specific gravity than the second particles, the vibration corresponding to either a first wave train, a second wave train or a third wave train, wherein the first wave train defined by a plurality of first waveforms each comprising a primary half sine wave followed by a pause, the pause having a pause time that is less than 0.1 of a half sine wave time, the second vibration wave train comprising a plurality of second waveforms each having the primary half sine wave followed by a plurality of high frequency sine waves, the plurality of high frequency sine waves comprising a frequency that is higher than the primary half sine wave and the plurality of high frequency sine waves comprise an amplitude that is lower than the primary half sine wave, the third vibration wave train comprising a plurality of third waveforms each having the primary half sine wave at least partially superimposed with the plurality of high frequency sine waves; and a controller connected to the electric motor, the controller comprising an output vibration signal that corresponds to at least one of the first, the second or the third vibration wave trains.

2. The mineral separation arrangement of claim 1, wherein the central axis is adjustable along the x, the y and the z axes.

3. The mineral separation arrangement of claim 1, wherein the mineral separation table further comprises drip channels along a drip edge portion of the mineral separation table.

4. The mineral separation arrangement of claim 1 further comprising a water dispenser configured to dispense water on the mineral separation table and a concentrated aggregate dispenser 140 configured to dispense the concentrated aggregate on the mineral separation table.

5. The mineral separation arrangement of claim 1, wherein the third vibration wave train comprises the high frequency sine waves superimposed over a trailing edge of the primary half sine wave.

6. The mineral separation arrangement of claim 1, wherein the controller comprises a user interface configured to receive instructions from a user.

7. The mineral separation arrangement of claim 1, wherein the first particles being high specific gravity particles are gold and the second particles being low specific gravity particles are tailings.

8. The mineral separation arrangement of claim 1 further comprising flexure supports that connect the mineral separation table to a frame, wherein the frame is essentially stationary while the mineral separation table vibrates.

9. The mineral separation arrangement of claim 1, wherein the electric motor is a voice coil motor.

10. The mineral separation arrangement of claim 1, wherein the first vibration wave train, the second vibration wave train and the third vibration wave train comprise a third vibration sequence.

11. The mineral separation arrangement of claim 1, wherein the primary half sine wave is in a first direction in plane with the planar surface and the plurality of high frequency sine waves are in a second direction that is different form the first direction, the second direction is defined in x/y/z coordinates.

12. The mineral separation arrangement of claim 1, wherein the primary half sine wave is in a first direction in plane with the planar surface, the first direction is offset by an angle $\lambda$ from the central axis.

13. The mineral separation arrangement of claim 1, wherein the primary half sine wave is in a first direction that is in plane with the planar surface, wherein the first direction is essentially orthogonal to the central axis.

14. A mineral separation device comprising:

a mineral separation table comprising a planar surface that is angled in a −z direction along an +x axis at an angle $\alpha$ and in the −z direction along a +y axis at an angle $\beta$ as defined in x/y/z coordinates;

an electric motor configured to generate a vibration in the mineral separation table, the vibration is in a primary direction that is in plane with the planar surface, the vibration is configured to separate aggregate into first particles and second particles when on the mineral separation table, the vibration corresponds to a first vibration wave train defined by a plurality of primary half sine waves each followed by a pause, the pause having a pause time that is less than 0.15 of a half sine wave time or a second vibration wave train defined by the plurality of the primary half sine waves and a plurality of high frequency sine waves, the high frequency sine waves comprising a frequency that is higher than the primary half sine wave; and a controller configured to provide the vibration wave trains to the electric motor.

15. The mineral separation device of claim 14, wherein the second vibration wave train is defined by a plurality of the primary half sine wave each followed by a plurality of the high frequency sine waves.

16. The mineral separation device of claim 14, wherein the second vibration wave train is defined by a plurality of the primary half sine waves that are at least partially superimposed with the plurality of high frequency sine waves.

17. The mineral separation device of claim 14, wherein the plurality of high frequency sine waves comprise an amplitude that is lower than the primary half sine wave.

18. The mineral separation device of claim 14, wherein the second vibration wave train further comprises a third frequency that is combined with the plurality of the primary half sine waves and the plurality of high frequency sine waves.

19. A mineral separation apparatus comprising:

a mineral separation table defined in x/y/z axes:

a planar surface of the mineral separation table angled in a −z direction along the +x axis at an angle $\alpha$ and in the −z direction along the +y axis at an angle $\beta$;

a voice coil motor responsive to a first or second vibration wave train received by a controller, the vibration wave trains configured to cause the voice coil motor to generate a vibration corresponding to the vibration wave trains in the mineral separation table, which causes aggregate to separate by differences in specific gravity, the first vibration wave train defined by a plurality of primary half sine waves each followed by a pause, the pause having a pause time that is less than 0.15 of a half sine wave time, the second vibration wave train defined by the plurality of the primary half sine waves and a plurality of high frequency sine waves, the high frequency sine waves comprising a frequency that is higher than the primary half sine wave.

20. The mineral separation apparatus of claim 19, wherein high frequency sine waves are generated by a second motor.

* * * * *